United States Patent [19]

Rabito

[11] 4,444,976

[45] Apr. 24, 1984

[54] SAG RESISTANT TWO COMPONENT ADHESIVE AND SEALANT

[75] Inventor: Thomas G. Rabito, Ashland, Ohio

[73] Assignee: The Goodyear Tire & Rubber Company, Akron, Ohio

[21] Appl. No.: 450,826

[22] Filed: Dec. 20, 1982

[51] Int. Cl.$^3$ .............................................. C08G 18/32
[52] U.S. Cl. ........................................ 528/60; 528/61; 528/62; 528/905
[58] Field of Search ............................. 528/60, 61, 64

[56] References Cited

U.S. PATENT DOCUMENTS

| | | | |
|---|---|---|---|
| 2,620,516 | 12/1952 | Mueller | 528/83 |
| 3,501,329 | 3/1970 | Kent et al. | 260/77.5 |
| 3,714,127 | 1/1973 | Fabris et al. | 528/60 |
| 3,812,003 | 5/1974 | Larson et al. | 428/423.7 |
| 3,846,351 | 11/1974 | Haffaker et al. | 528/64 |
| 3,886,122 | 5/1975 | Fabris et al. | 528/64 |
| 3,925,283 | 12/1975 | Dahl | 528/64 |
| 3,935,051 | 1/1976 | Bender et al. | 523/209 |

*Primary Examiner*—H. S. Cockeram
*Attorney, Agent, or Firm*—J. D. Wolfe; R. D. Thompson

[57] ABSTRACT

An improved two component adhesive whereby said adhesive exhibits sag resistance on a vertical surface substantially immediately after the two components are mixed with adequate gel time for use thereof said two component adhesive being composed of a polyurethane prepolymer component and a curative component mixed at a ratio of 4:1.

6 Claims, No Drawings

SAG RESISTANT TWO COMPONENT ADHESIVE AND SEALANT

TECHNICAL FIELD

This invention relates to an improved two component adhesive or sealant whereby said adhesive exhibits sag resistance on a vertical surface substantially immediately after the two components are mixed with adequate gel time for use thereof. More particularly this invention provides an improved adhesive formed by mixing two components in the ratio of 4:1 or higher to give said adhesive sag resistance with satisfactory gel time at least 2 and a viscosity suitable for ready application of the adhesive.

BACKGROUND

Two component adhesive systems have been described in the patent literature, as represented particularly by U.S. Pat. No. 3,812,003 and No. 3,935,051, as well as being available commercially for a decade or more from the adhesive suppliers. In general these adhesives comprise a prepolymer component and a curative component which are generally mixed in ratios of about 4:1 or higher to give essentially a highly fluid mix unless the mix is highly loaded with filler. Typically the prepolymer component is the reaction product of an organic polyisocyanate with a reactive hydrogen containing material containing mostly two hydroxyls and having a molecular weight of 500 to about 5000 or higher, preferably selected from the polyester polyols and the polyether polyols. The curative component preferably is a low molecular weight polyfunctional polyol preferably having three or more hydroxyls of relatively low equivalent weight. Also these adhesives generally contain sufficient urethane catalyst to give the desired gel time to permit the adhesive to be applied at least to the substrate before the adhesive gels. The prepolymer usually contains about 2 to about 10 percent and preferably 4 to about 7 percent by weight of free NCO.

Since these adhesives without filler inherently have low sag resistance those of ordinary skill in this art have incorporated fillers to develop or increase the sag resistance where said resistance is needed. Unfortunately this technique also increases the viscosity of the component or components containing the filler and makes it more difficult to mix the components and then spread the adhesive on a substrate. Hence loading with high levels of filler needed to achieve sag resistance results in difficulties in getting satisfactory mixing because high pressure mixing or high shear equipment and high pressure pumping equipment is needed. Further, high loading in many cases tends to lower the strength of the adhesive bond and therefore is undesirable from that standpoint.

U.S. Pat. Nos. 3,714,127 and 3,886,122 teach to add primary diamines to reduce moisture sensitivity of the polyurethane adhesive, but do not teach the use of the secondary diamines to get sag resistance.

DISCLOSURE AND PRACTICE OF THE INVENTION

This invention provides a two component adhesive and sealant characterized by exhibiting sag resistance immediately after the prepolymer component and the curative component are mixed in about 4:1 ratio or higher and still has a viscosity low enough and a gel time sufficient to permit the adhesive to be applied readily to a surface and the coated surface to be placed in an adhering relationship with another surface when the polyurethane or prepolymer is the reaction product of an organic polyisocyanate and a reactive hydrogen containing material such as polyester polyols and/or polyether polyols of 300 to 3000 and up to about 6000, and preferably 1000 to 2000 molecular weight, with the urethane catalyst and filler, and said curative component is composed of a mixture of 0.1 to 1.0 mol of a reactive hydrogen containing material having at least two, and preferably three to six hydroxyls of 100 to 2000, and preferably 100 to 1000 molecular weight and 0.01 to 1.0, and preferably 0.04 to 0.4 mol of a secondary diamine having a molecular weight preferably less than 100, specifically piperazine as those up to about 325, and optionally any filler or catalyst that may be used.

The prepolymer component is formed by reacting in the well known manner 1 to 2 mols of a reactive hydrogen material such as the polyester polyols or the polyether polyols of 300 to about 6000 molecular weight with about 2 to 5 mols of an organic polyisocyanate such as toluene diisocyanate, methane di(phenyl isocyanate) and polyaryl methane polyisocyanate to form a prepolymer preferably at elevated temperatures after the polyol has been degassed under a vacuum. The polyol can have the catalyst, such as the well known urethane metallic catalysts of tin, lead and mercury and/or the tertiary amines, such as 1,2,4-trimethyl piperazine, or triethylene diamine incorporated therein prior to or during the reaction of the polyol and the organic polyiisocyanate. The fillers, when used, are preferably inert powdery materials such as the representative carbon blacks and fine or powdery silicas. Usually the fillers are used in as small an amount as one to five parts and in as large amounts as 50 to 200 or more parts per 100 parts of the prepolymer. When it is desired to obtain a no-sag adhesive very large amounts of filler have been found to be desirable heretofore, but this invention gives a non-sag adhesive without the use of large loadings. A non-sag adhesive or sag-resistant adhesive is one when applied as a bead to a cardboard surface at a 45° angle to the horizontal does not exhibit creeping or sag of the bead before the adhesive sets or gels or as measured by ASTM Method D2202.

Representative examples of useful reactive hydrogen containing materials are the polyester polyols such as a condensation product of a glycol or an ether glycol containing preferably 2 to about 12 carbon atoms with a dicarboxylic acid preferably of about 5 to about 12 carbon atoms and the polyether glycols obtained by condensing the alkylene oxides of 2 to about 12 carbon atoms to give products such as the polypropylene ether glycols, polytetramethylene ether glycols and polypentamethylene ether glycols. It should be appreciated that small amounts of polyester triol or tetraols or the polyether triols or tetraols can be used also. Any of the organic polyisocyanates of the aromatic, aliphatic and cycloaliphatic type are useful in making the prepolymers, especially useful ones being the toluene diisocyanates, methylene di(phenyl isocyanate) (MDI), isophorone diisocyanates, tolyl diisocyanates, napthalene diisocyanates, hydrogenated MDI and hexamethylene diisocyanates as well as those commercially available, including the polymeric polyisocyanates such as polymeric MDI and the quasi polyisocyanates.

As previously indicated the curative component comprises a mixture of a low molecular weight polyol containing at least two hydroxyls and usually three to six hydroxyls and a secondary diamine having a molecular weight preferably 50 to 100, but up to about 325 and exhibiting the ability preferably to develop a turbidity within 30 seconds with the isocyanate of the prepolymers at half molar concentration by the hot methylene chloride test as disclosed in U.S. Pat. No. 2,620,516. The secondary alkyl diamines that meet the hot methylene chloride test are particularly suited to make the curative of this invention.

The preferred secondary diamines are the dialkyl-N,N'-alkylene diamines where the total number of carbon atoms in the alkyl and alkylene radicals is about 4 to 20 and such as dimethyl or diethyl-ethylene or propylene diamine. Piperazine is particularly preferred as it is a liquid that can be readily boiled away to control amount of diamine added.

Some representative and preferred polyols for use in the curative are those of class of alkanolamines such as triethanolamine, diethanol, aniline, N,N,N',N'-tetrakis(2-hydroxypropyl) ethylene diamine and other condensation products of alkylene oxides of 2 to about 18 carbon atoms on an amine, preferably a diamine where the organic radical contains 2 to about 20 carbon atoms and normally called di or trialkanolamines as well as the usual low molecular weight diols, with some triols or tetraols.

The nature of this invention can be seen more readily and appreciated by reference to the following representative examples where all the parts and percentages are by weight unless otherwise indicated.

EXAMPLE 1

A prepolymer was made by charging 100 parts of a polypropylene ether glycol of approximately 2000 molecular weight to a reactor equipped with a stirrer and having connection to a vacuum apparatus.

Thirty (30) parts of polymeric methylene di(phenyl isocyanate), also referred to in the trade as polymeric MDI, of about 2.7 functionality, 33 parts of commercial toluene diisocyanate and 64 parts of talc were added and reacted at 50° to 80° C. with stirring and under vacuum until the prepolymer had a free NCO of about 9 to 85 percent.

EXAMPLE 2

The curative component No. 1 was prepared by mixing 140 parts of ethylene oxide capped polypropylene ether tetraol of about 350 molecular weight, 260 parts of ethylene oxide capped polypropylene ether tetraol of 500 molecular weight, 2 parts of piperazine in a heated mixer at a temperature of 102° C. until 0.05% moisture was removed. Then to the mixture was added 15 parts of toluene diisocyanate (TDI), 2 parts of triethylene diamine and 12 parts of piperazine with stirring and vacuum was pulled on the mixture for 30 minutes when the temperature reached 95° C. The curative had a viscosity at 25° C. of 8000 centipoises (CPS) and on standing stabilized at 9000 CPS. A series of lap shear bond tests were run using polyester fiber glass impregnated specimen identified as series 7101/7062. Each specimen was primed by wiping with a cloth wet with methylene chloride and then wiping with a commercial primer of a blend of 2% of organic polyisocyanate, methane di(phenyl isocyanate) and 0.5% triethylene diamine in methylene chloride as a solvent. A mixture of the prepolymer of Example 1 and the curative of Example 2 at a ratio of 4:1 on a weight basis was formed in an adhesive application machine and applied to the primed specimens to give sufficient adhesive to give a bond line 2.54 centimeters by 2.54 centimeters by 0.076 centimeters between the cross lapped specimens. The adhesive on the specimen was cured 45 minutes at 24° C. under 250 pounds per square inch pressure. Then sets of three test samples were used to test the bond strength. At room temperature, viz, 24° C., 82° C. and −18° C. on an Instron tester by pulling the lapped strips apart at the rate of 1.27 centimeters per minute at 24° C. Each of the three sets of lap shear specimens failed by delamination and the respective bond strengths were 610, 620 and 535 psi. At 82° C. each of the three sets of lap shear specimens had a bond strength of 285, 390 and 265 psi and the bond strength at −18° C. on each specimen was 545, 500 and 645 psi.

The above adhesive was used to lay a bead on a 45° cardboard surface to determine sag resistance and it showed no tendency to run. This adhesive had a gel time of at least 2 minutes at 24° C.

The other secondary diamines such as diethyl-NN'-ethylene diamine can be used to replace piperazine in the above curative to yield a satisfactory adhesive with satisfactory sag resistance.

While certain representative embodiments and details have been shown for the purpose of illustrating the invention it will be apparent to those skilled in this art that various changes and modifications may be made therein without departing from the spirit or scope of the invention.

I claim:

1. A two component adhesive composed of a polyurethane prepolymer component having free NCO and a curative component, said curative component being comprised of a mixture of 5 to 15 mols of a reactive hydrogen containing material having 2 to 5 hydroxyls of 100 to 3000 molecular weight and 0.5 to 3.0 mols of a secondary diamine having a molecular weight less than 325 said adhesive being characterized when the components are mixed at a ratio of 4:1 on a weight basis of being sag resistant immediately after mixing and exhibiting a gel time at 24° C. of at least two minutes.

2. The adhesive of claim 1 wherein the secondary diamine exhibits the ability to develop a turbidity in the hot methylene chloride test with isocyanate in the prepolymer within 30 seconds.

3. The adhesive of claim 1 wherein the secondary diamine is a dialkyl-N,N'-alkylene diamine where the total carbons in the alkyl and alkylene groups are about 20.

4. The adhesive of claim 1 wherein the reactive hydrogen containing material of the curative component contains three or four hydroxyls.

5. The adhesive of claim 1 wherein the reactive hydrogen containing material is a dialkanol of aniline.

6. The adhesive of claim 1 wherein the diamine is piperazine.

* * * * *